United States Patent Office 3,551,352
Patented Dec. 29, 1970

3,551,352
CATALYTIC INORGANIC POLYMER OF SILICON, OXYGEN, AND AN IRON GROUP METAL AND METHOD OF MAKING
Norman L. Carr, Allison Park, Harry A. Hamilton, Natrona Heights, and Meredith M. Stewart, Penn Hills Township, Allegheny County, Pa., assignors to Gulf Research & Development Company, Pittsburgh, Pa., a corporation of Delaware
No Drawing. Continuation-in-part of application Ser. No. 615,910, Feb. 14, 1967. This application June 20, 1969, Ser. No. 835,247
Int. Cl. B01j *11/34, 11/74*
U.S. Cl. 252—439                            11 Claims

ABSTRACT OF THE DISCLOSURE

A catalyst having the elements silicon, oxygen and an iron group metal chemically associated together in the form of an inorganic polymer. The catalyst is prepared by the calcination of the solid product resulting from the cogelation of a mixture of a silica sol and a solution of an iron group metal salt, such as ferric chloride.

---

This application is a continuation-in-part of United States patent application Ser. No. 615,910, filed Feb. 14, 1967, now U.S. Pat. No. 3,491,020.

This invention relates to a novel catalyst comprising silicon, oxygen and an iron group metal in chemical combination for use in sweetening sour hydrocarbons and to a process for preparing the catalyst.

BACKGROUND OF THE INVENTION

Petroleum products contain undesirable sulfur derivatives such as mercaptans which impart to such products and their distillates an objectionable odor and corrosiveness. Distillates containing such objectionable sulfur derivatives are known as "sour" distillates and processes for oxidizing mercaptans to disulfides in these "sour" distillates are known as "sweetening."

The sweetening process for the oxidation of mercaptans to disulfides is usually associated with gasoline distillates or lighter materials such as LPG, natural gasoline, naphthas, etc., where the odor and corrosive properties of the mercaptans are undesirable. Upon oxidation, these mercaptans are converted to disulfides, which are often not objectionable. The disulfides are usually present in such small amounts that they are allowed to remain in the finished product. In this case, the "sweetened" hydrocarbon has the same sulfur content as the untreated stock.

A gasoline is "sweet" or "doctor" negative by definition, when no dark discoloration occurs at the interface after shaking it with an equal volume of doctor solution (an alkaline plumbite solution) and a small amount of sulfur. The test is sensitive to one part of the hydrogen sulfide or active mercaptan in 200,000 parts of distillate.

SUMMARY OF THE INVENTION

The catalyst of this invention is a high surface area cogelled composite consisting essentially of an iron group metal, silicon and oxygen chemically associated together in an inorganic polymer, which has utility both as a catalyst and an adsorbent. Additionally, this invention relates to a process for the preparation of the catalyst composition which comprises combining a cation-free silica sol with an aqueous solution of an iron group metal salt, causing cogelation of the resulting mixture and calcining the cogelled chemical composite to produce the inorganic polymer of silicon, oxygen and an iron group metal having catalytic and adsorbent properties. An important and useful characteristic of this catalyst is that a portion of the oxygen contained in the catalytic composite is available for the selective reaction of sweetening hydrocarbons and that this oxygen is readily replaceable by reoxidation of the catalyst.

It is an object of this invention to prepare a high surface area catalyst composition of silicon, oxygen and an iron group metal in an inorganic polymer. It is another object of this invention to prepare a high surface area composition which is substantially free of alkali and alkaline earth contaminants. It is another object of this invention to prepare a catalyst for sweetening sour hydrocarbons in which a portion of the oxygen in the catalyst is available for the sweetening reaction. It is yet another object of this invention to prepare a catalyst capable of selective low temperature oxidation. It is another object of this invention to prepare a composition which has utility as an adsorbent. Other objects and advantages of the invention will appear hereinafter.

In accordance with the invention, a dilute silica sol, preferably freshly prepared and substantially free of cationic impurities, is mixed with an aqueous solution of a compound capable of yielding iron group metal ions in solution, such as ferric chloride. Cogelation of the resulting mixture is accomplished by raising the pH with a suitable base such as ammonia. Once the cogel has set, it is washed to substantially remove any soluble salts which have formed and any residual base. To prepare this resulting cogel for catalytic or adsorbent use, it is dried and calcined. Although catalytically active materials such as promoters may be added prior to drying and calcining, it is preferred to impregnate the catalyst after it has been calcined if any catalytically active material is to be incorporated therewith and again drying and calcining it.

In the practice of the process of the instant invention it is desirable that the silica sol be free or substantially free of cationic impurities. By cationic impurities are meant metallic cations, especially the alkali metals as, for example, sodium, and the alkaline earth metals, as exemplified by calcium. When such metallic cations are present in the silica sol, they cannot readily be removed at later stages of the catalyst preparation and become included in the catalyst structure. Such metallic cations tend to inhibit the desired catalytic properties of the final product.

A number of methods are available for the preparation of a cation-free, dilute silica sol. Preferably, a dilute aqueous solution of a sodium silicate, such as water glass, if flowed, as by percolation or pumping, through a bed of protonated cation-exchange material to recover an effluent dilute silica sol substantially free of cationic impurities. Any soluble silicate can be used in this method but the sodium silicate solutions commonly known in the art as "water glass" are preferred since they are inexpensive and readily available.

The silicate solution used in preparing the cation-free silica sol is dilute, preferably containing no more than the equivalent of about five weight percent silica and preferably between 1 and 3 percent silica. Solutions more or less concentrated can be employed satisfactorily, the upper and lower limits being that concentration which will pass through the ion exchange column without gelling and that volume of liquid which can be conveniently handled, respectively.

Any solid cation-exchange material insoluble in water can be used to prepare the protonated silica sol. Cation-exchange resins of high cation-exchange capacity such as sulfonated phenol formaldehyde resins or divinylbenzene cross-linked sulfonated polystyrene resins, like Amberlite IR–120 (manufactured by Rohm and Haas) have given excellent results in the production of dilute silica sols. In every instance the ion-exchange material must be in acid form. It can be placed in this form by washing with a suitable strong acid such as sulfuric acid or hydrochloric acid. Any residual free acid can be washed from the ion-exchange material with water.

In producing the cation-free silica sol, a single bed of cation-exchange material can be employed or a plurality of beds arranged in series or in parallel or both can be used. When beds are employed in series, it is advantageous to feed the fresh silicate solution to the most nearly spent bed of cation-exchange material with a substantially cation-free silica sol emanating from the most recently regenerated bed of ion-exchange material. Regeneration is accomplished by acid washing, as described above for the initial preparation of the ion-exchange material. To determine when a bed is spent, it is convenient to measure continuously or from time to time the pH or the conductivity of the effluent silica sol. The pH of a satisfactory sol is in the neighborhood of 3 and its specific conductance is in the neighborhood of $10^{-4}$ to $10^{-5}$ ohm$^{-1}$ cm.$^{-1}$. When the pH rises to about 5, the processing is preferably interrupted for regeneration of the beds.

The pH of the silica sol is desirably maintained at a level less than 5 to prevent premature gelation of the sol. As indicated below, dilute, cation-free silica sols are unstable, tending to gel, which tendency is greatly accelerated when the pH is raised. Further, a rise in pH of the effluent silica sol indicates that the ion-exchange bed is no longer functioning efficiently in exchanging protons for cationic impurities. Maintaining the pH at less than 5 tends to maximize the stability of the silica sol while minimizing the concentration of cationic impurities.

Silica sols, substantially free of cationic impurities, as prepared by other methods can also be employed within the scope of this invention. For example, satisfactory dilute cation-free silica sol can be made by hydrolysis of ethylorthosilicate or of silicon tetrachloride.

"Water glass" is prepared by fusing silica with sodium carbonate, the product is a colloidal suspension of silica in sodium silicate. When this suspension of silica in sodium silicate is treated by passage through a protonated ion-exchange column, the resulting product is an aqueous colloidal suspension of silica and silicic acid having a pH of about 3. This silica sol, wherein the colloidal particles of silica and silicic acid are very finely dispersed, is the starting material for this invention. The silica sol in this form is relatively stable in that it does not gel immediately but on standing changes akin to polymerization do occur. The colloidal particles become larger and the molecular weight of the silicic acid increases as the chain length grows. This process continues until the material has gelled. It is believed that polymerization is a function of pH, the nature of the impurities, the mobility of the impurities and the mobility of the particles.

According to the method of this invention, the freshly prepared silica sols, substantially free of cationic impurities, are preferably mixed promptly with the aqueous solution of the compound that yields the desired iron group metal in solution. When the silica sol has been freshly prepared, the colloidal particles are very small in size and the molecular weight of the silicic acid is very low. These characteristics of the freshly prepared silica sol permit a near-atomic mixing of the elements to permit interreaction of the silicon, iron group metal and oxygen with the ultimate formation of a polymer of these elements. Furthermore, this procedure results in a final composition with an extremely high surface area, as high as about 350 M.$^2$/g. and higher. It is a preferred practice, therefore, when the silica sol has been prepared by flowing a soluble silicate through an ion-exchange resin bed, to flow the effluent cation-free silica sol directly into an aqueous solution of the iron group metal.

For the practice of this invention, the salt of the iron group metal employed must be soluble in the solvent used, for example, water, ethyl alcohol, dioxane, etc., in order that the iron group metal and silicon can form a cogel when the base is added. Examples of the salts of iron group metals which may be successfully employed in this invention are the nitrates, sulfates and chlorides of cobalt, nickel and iron. The composition which we prefer to use in the practice of the instant invention is ferric chloride. It is readily soluble in water, is inexpensive, is readily available in quantity, easily forms an insoluble gelatinous precipitate in the presence of alkali such as ammonia thereby readily permitting the desired cogelation and yields a finished catalytic product of outstanding properties. Although a preferred mode of operation is to use the iron group metals in their higher oxidation states, it is within the contemplation of this invention to employ a soluble salt of an iron group metal in its lower oxidation state, form the cogel and then oxidize the metal ion to its higher oxidation state.

When the silica sol is added to the solution of iron group metal cations, mixing should be sufficiently thorough to produce a completely homogeneous liquid. Because cation-free dilute silica sols are unstable, having a tendency to gel, it is essential for superior results, as indicated above, that the silica sol be used soon after its preparation, i.e., within 12 hours and preferably within one hour after its preparation. As indicated above, the preferred practice is to flow the silica sol directly from the bed of ion-exchange resin into an aqueous solution of iron group metal cations. The solution of iron group metal cations will generally contain the cations of only one of the three iron group metals, however, the solution can contain a mixture of the cations of any two or all three of the iron group metals.

Once the mixture has been thoroughly homogenized, gelation is brought about by increasing the pH of the mixture. This may be done conveniently by addition of aqueous ammonia with stirring or addition of gaseous ammonia, as through a sparger. The alkaline agent chosen for raising the pH of the mixture of silica sol and iron group metal cations should preferably be such as to leave no harmful residue in the resulting composition. The alkali metals and alkali metal hydroxides and such compounds therefore are not generally used, for they leave a residue of alkali metal in the product difficult to remove by washing. Ammonia, on the other hand, is cheap, easily available, and leaves no residue upon calcination of the resulting gel. Other bases such as trimethyl ammonium hydroxide, hydrazine or quinolinium hydroxide, can be employed, but they are expensive and are considered to have no particular advantage. When salts of nickel and cobalt and such metals are used as the source of iron group metal cations, ammonia cannot be used to adjust the pH since these metals form complex ammines in admixture with ammonia. A convenient means of adjusting the pH, when salts of metals such as nickel and cobalt are used, is to add ammonium bicarbonate.

On addition of the base to the iron group metal cation-silica sol solution, a slurry is formed consisting of a gelatinous precipitate and water. Although this gelatinous precipitate can be removed at will, we prefer to allow it to stand about 16 hours to assure complete precipitation. The precipitate can be separated from the supernatant liquid in any convenient manner as, for example, by filtration. The precipitate is then washed with water to remove any contaminants. This washing process advantageously can be continued until conductivity measurements reach a constant level.

Once the precipitate has been washed free of contaminants, it can be dried and calcined. If desired, however, it can be impregnated before drying or before calcining with promoters, catalysts and the like. To composite the catalyst with the promoters of the process of the instant invention, any conventional procedure for the preparation of a multicomponent catalyst may be used. Preferably, the gelatinous precipitate prepared as specified above is, after washing, dried, calcined and impregnated with a promoter suitable for the process of the instant invention. The gelatinous precipitate can be dried, for example, in a forced-draft oven, at a temperature in the range of from 200° to 300° F. over a period of from 10 to 30 hours. The dried product can then be calcined in air at a temperature of from 800° to 1000° F. over a period of from 10 to 20 hours, preferably at from about 850° to 950° F. for from about 8 to 16 hours, to form the catalyst of the instant invention.

Although the catalyst can be impregnated with the promoting agents of the process of the instant invention at any time after the gelatinous precipitate has been formed, it is a preferred practice to impregnate the catalyst with the promoting agent after calcination. This procedure assures the integrity of the catalyst structure and also admits of greater latitude and convenience should it become desirable to change the promoting agent. It is to be particularly noted that the catalyst is complete in itself once it has been calcined and that promoting agents are used to enhance the inherent catalytic properties. To optimize the properties of the catalyst composite, the promoting agent, in a preferred embodiment, is not only added after the catalyst structure is established but is selected so as to combine with the catalyst via terminal chemical bonds, leaving the catalyst structure substantially undisturbed.

As will be shown below, this catalytic composite has utility as a low temperature oxidation catalyst and an adsorbent for oxygen-, sulfur- and nitrogen-containing compounds. The general use of the composite is for the removal and/or reaction of nonhydrocarbon constituents from natural or synthetic petroleum fractions. Another use is for the low temperature oxidation of hydrocarbons to produce oxygenates, light paraffins and olefins.

In one embodiment of the instant invention, the catalytic composite described above and prepared as in Example 1 below can be used in an improved method for sweetening sour hydrocarbons. More particularly the catalytic composite can be used for selectively oxidizing mercaptan sulfur, which is contained in a hydrocarbon, to form disulfide sulfur, at low temperatures.

We have found that if a petroleum distillate containing mercaptans is subjected, at a suitable temperature, to contact with the cogelled catalytic composite of the process of the instant invention either in the presence or absence of added free oxygen, such mercaptans are converted to alkyl disulfides or other non-corrosive compounds having no offensive odor and the distillate is thus "doctor" negative.

The contact treatment with the catalytic composite described above can be carried out at a temperature as low as 0° F. to 200° F. The preferred temperature is in the range of from 80° F. to 125° F. The process can be carried out at a pressure ranging from atmospheric to 500 p.s.i.g. The preferred range of pressure is from 25 to 100 p.s.i.g.

When added free oxygen in the form of air or other suitable source is used, it is advantageous to bring the oxygen and the distillate into intimate contact with each other prior to contact with the catalyst. The purpose of his oxygen addition is to replenish the structural oxygen removed from within the catalyst during the oxidation reaction. The catalytic composite contains sufficient chemisorbed or matrix oxygen within its structure which is available for sweetening to permit at least one complete cycle of a practical size without the addition of any oxygen whatever to the feedstock. However, the addition of process oxygen tends to extend the practical working cycle time of the catalyst and reduces the frequency of reactivation. The oxygen concentration of the feedstock may range then, from no oxygen in the feedstock to that naturally present to that oxygen concentration resulting from complete saturation of the feedstock with air. Although one mode of operation, saturating the feedstock with air, is not critical within the contemplation of this invention, this air saturation eliminates any need for such control or metering apparatus as would be necessary if the air or oxygen concentration were critical when supplemental oxygen is used. It is also desirable and necessary for repeated use to subject the composite catalyst to an oxidation treatment for reactivation when it becomes spent. The specific method is discussed later.

We have found that the new, very high surface area catalyst comprising a cogelled chemical composite of an iron group metal, oxygen and silicon is a highly effective catalyst for the selective oxidation of mercaptans to disulfides. The catalytic composite described with reference to iron as the iron group metal is a chemical combination comprising iron, oxygen and silicon in an amorphous, inorganic high molecular weight polymer-like material containing multiple and random Si—O—Si, Si—O—Fe, and Fe—O—Fe linkages, with each silicon atom directly united to four oxygen atoms and each iron atom directly united to three oxygen atoms. The nature of the catalyst is such that some oxygen is readily available from within the structure for selective oxidation of adsorbed marcaptans. Reactivation of used catalyst in oxygen substantially restores the catalyst to its original condition.

Not all concentrations of the iron group metals applicable to the practice of the instant invention can be employed under the process conditions herein set forth. At metal concentrations in excess of about 60 percent by weight, the catalyst demonstrates crystalline characteristics and displays an attendant loss of desirable properties. The iron group metal and silica sol are preferably used in proportions to make the catalytic composite with an atomic ratio of iron group metal to silicon to oxygen within the range of about 1 to 2 to 5.5 to about 1 to 12 to 25.5. The most preferred catalytic composite contains an iron group metal to silicon to oxygen atomic ratio of about 1 to 4 to 9.5. In the oxidized catalytic composite there is sufficient oxygen to fully satisfy the valence requirements of both the iron group metal and the silicon. This invention contemplates the utilization of either one, two or all three iron group metals in the catalyst composite, preferably with a total iron group metal content within the specified proportions.

The catalyst effect of the cogelled catalytic composite is greatly enhanced when promoted with selenium or one of the alkali metals. The preferred alkali metal promoter is potassium oxide. The promoter is preferably combined with the cogelled catalytic composite of the instant invention after it has been calcined. For this purpose the composite is, after it has been washed and dried, calcined at a temperature of from about 800° to 1000° F. for about 16 hours, preferably from about 850° to 950° F. for about 16 hours. Once the composite has been calcined it can be impregnated with the desired promoter. For this purpose any convenient mode of impregnation can be employed. We prefer, however, to employ an aqueous solution of a compound of the desired promoting agent which will leave, on decomposition by thermal treatment, a deposit of the promoting agent in an active form, as for example, the oxide. We have found it convenient, therefore, to impregnate the composite with aqueous selenic acid, where selenium is the promoter, and with an aqueous solution of an alkali metal nitrite, as for example, potassium nitrite, when an alkali metal is the promoting agent.

When selenium is the desired promoter, the concentration of the selenic acid solution is adjusted so as to yield a deposit of from about 0.1 to about 10.0 percent of selenium, calculated as the element, based on the catalyst weight. We prefer to obtain a catalyst containing from about 5.0 to 10.0 weight percent of selenium, desirably about five percent. The alkali metal deposit on the composite is calculated so as to lie in the range of from 0.05 to 5.0 weight percent based on the composite, preferably from 2 to 5 weight percent. We have found that a catalyst containing about one percent by weight of potassium is highly effective in a process for sweetening hydrocarbons.

Prior to impregnation the calcined composite can be broken up to any convenient size, as for example 6–10 mesh. This broken-up composite can then be contacted with the solution of promoting agent, the impregnation with this solution being carried to the point of incipient wetness. The composite can then be dried in any convenient manner and for this purpose we use a temperature in the range of from 200° to 300° F. for a period of about 10 to 30 hours. Once the impregnated composite has been dried it can be calcined. The temperature at which the impregnated composite is calcined is dependent upon the impregnating agent. Since selenium is volatile at higher temperatures, the selenium impregnated composite is calcined at a temperature in the range of from 500° to 750° F. for a period of from about 8 to 24 hours, preferably from about 550° to 700° F. for about 16 hours. In the case where the composite is promoted with an alkali metal it can be calcined at a temperature of from about 800° to 1000° F. for from about 8 to 24 hours, preferably from about 850° to 1000° F. for about 10 hours.

The promoted catalyst is not affected by a relatively high mercaptan content nor are there any unwanted side reactions such as accumulation of sulfur compounds, gumming or coking—the product is also water white. The catalyst does lose its activity in use, however, possibly as a result of a reduction in lattice oxygen within the catalyst and/or adsorption of by-product water. For this reason it is advantageous to employ multiple reactors which are alternately on stream. This permits the reactivation of one catalyst bed while the other or others continue to function. The catalyst can be reactivated by means of a thermal purge in the range of from about 500° to 800° F. with an oxygen-containing gas. We have found that the highest catalytic activity is achieved by a short-time activation with air at atmospheric pressure. Long activation periods and/or activation under pressure have the effect of reducing catalytic activity. Where the catalytic composite of Example 1 below is employed, we have found that an effective activation resulted from passing air at atmospheric pressure over the catalyst bed at a temperature of about 500° F. for about 40 minutes. The alkali metal oxide promoted catalyst, for example, a potassium oxide promoted catalyst, can be reactivated by heating to a temperture in the range of from about 500° to 800° F. with an air or air-flue gas mixture. The selenium oxide-promoted catalyst is similarly reactivated but at a temperature in the range of from about 500° to 700° F., since selenium is volatile at higher temperatures. The catalyst should not be exposed to steam in reactivating insofar as steam regeneration tends to reduce the catalyst activity. The reactivation of the catalyst is not to be confused with the type of oxidative regeneration common in the cracking and hydrocracking art. The main purpose of reactivation in our process is to replenish the oxygen in the lattice structure of the catalyst and to remove excess water which may hinder catalytic activity. The temperature range of 500° to 800° F. is sufficient to accomplish this purpose and also to remove any slight deposits which might have formed on the catalyst.

In a general embodiment of this aspect of our invention, the sour hydrocarbon feed is contacted with air and this distillate-air mixture is heated. Either the distillate, or the mixture may be preheated to the reaction temperature, or the mixture may be heated in the reaction vessel.

The distillate and air are passed into the reaction vessel wherein the oxygenated catalyst has been charged and appropriate conditions of temperature and pressure are maintained. The space velocity of the distillate-air mixture is, in general, dependent on the properties desired for the final product and the character of the feedstock, i.e., its mercaptan content. A suitable space velocity is in the range of from 1 to 50 LWHSV based on the total flow; we prefer the range of from 10 to 20 LWHSV. In general, the higher the mercaptan content of the feed and the greater the removal from the final product, the lower will be the space velocity. The "sweetened" product together with excess air is passed from the catalyst bed into a suitable condenser, which is maintained at a temperature sufficiently low to condense any distillate vapors. The air is separated from the distillate and a noncorrosive, and "doctor" negative product is recovered.

The cogelled catalytic composite described above and in Example I below has been found to have tremendous adsorptive capacity for certain sulfur, nitrogen and oxygen compounds as exemplified by thiophene, indole and benzaldehyde. We have found that although very little net adsorption of sulfur compounds occurs on the composite prepared by the process of the instant invention, this being explained by the capacity of the composite for the low temperature oxidation of indigenous mercaptan compounds, the composite described above has a greater adsorbent capacity for the oxygen, nitrogen and sulfur compounds exemplified by benzaldehyde, indole and thiophene than currently available adsorbents, as for example, molecular sieves. Example V, below clearly demonstrates the superiority of the composite of the instant invention over other adsorbents now available having utility for removal of nitrogen, oxygen and sulfur compounds from petroleum fractions.

The more detailed operation of our invention is illustrated by the following examples. There are, of course, many forms of this invention obvious to one skilled in the chemical art once the invention has been revealed and it will accordingly be understood that these examples are illustrative of the invention and not limitations thereon.

EXAMPLE I

To make a dilute, substantially cation-free silica sol, 2610 grams of sodium silicate solution (28.7 percent $SiO_2$) were mixed with 30 liters of water. The mixture was flowed through a bed of 3000 grams of protonated Amberlite IR–120 cation-exchange resin (a sulfonated styrene polymer cross-linked by a small proportion of divinylbenzene and manufactured by the Rhom and Haas Company). Dilute silica sol issued from the bed having a pH of 3.25. The bed was rinsed with an additional five liters of water, the liquid rinsed from the bed being added to the dilute silica sol.

In five liters of water were dissolved 842 grams of ferric chloride hexahydrate ($FeCl_3 \cdot 6H_2O$). The resulting solution was added with mixing to the dilute silica sol prepared as described above. A dilute aqueous ammonia (9 percent $NH_3$) stream was added to the mixture with mixing in an amount sufficient to raise the pH of the resultant mixture to 7.8. This resulted in the formation of a gel. The slurry of gel and liquid was allowed to stand overnight. The gel was separated by filtration and was washed with water until the conductivity of the washings had fallen to a constant level. The washed gel was dried at 250° F. for 16 hours and formed into pellets $\frac{3}{16}$ inch in diameter. These were calcined at 900° F. for 16 hours in air. The pore size distribution of the calcined pellets was determined by nitrogen adsorption measurement; 93.7 percent of the pore volume was in pores of radius less than 50 angstroms, the average pore radius was determined to be 15.6 angstroms and the surface area was found to be 367 meters$^2$ per gram. The sodium content of the calcined pellets was determined to be less than 0.01 percent. The calcined pellets were found by their X-ray diffraction pattern to be an amorphous, noncrystalline mass comprising iron, silicon and oxygen. No free oxide of iron was detected. The product was determined to be an inorganic noncrystalline polymer of iron, silicon and oxygen with the iron and silicon randomly distributed through the material and containing about 17 weight percent iron, about 35 percent silicon and about 48 percent oxygen.

EXAMPLE II

The above-described catalyst was employed in a process for the sweetening of sour hydrocarbons involving the low temperature selective oxidation of mercaptan sulfur and such compounds to disulfide sulfur. A fixed-bed reactor, 1 inch ID x 4 feet, was prepared by sandwiching 50 grams of the catalyst described above between 6 inch layers of quartz and placing a deadman on top of the bed. Before the catalyst was placed onstream, it was activated with air at atmospheric pressure for 5 hours at 800° F. The catalyst bed was allowed to cool to 80° F. and at this point the feed, pentane containing 0.1 percent ethyl mercaptan (500 p.p.m. sulfur), 0.005 percent dimethyl sulfide and 0.005 percent dimethyl disulfide, was charged upflow under 80 p.s.i.g. pressure into the reactor, the liquid weight hourly space velocity being 5.9. When the catalyst was completely wetted, 0.2 s.c.f. air/hour were admitted into the feed stream. A throughput weight/weight ratio of 49 was obtained at the point were a concentration of 25 p.p.m. ethyl mercaptan in the product was detected. The product pentane was water white and doctor sweet.

The performance of the catalyst has been judged by the length of the sweetening cycle, and hydrocarbon throughput-to-mercaptan breakthrough has been used as the response function. "Throughput" is a measurement of catalyst cycle life and represents the weight of sour hydrocarbons treated over a weight of catalyst prior to mercaptan sulfur breakthrough at the 25 p.p.m. level into the product. All throughput values presented hereafter will have these units. The sweetened product was monitored continuously by an on-stream mercaptan analyzer. A product sample slip-stream was fed continuously through an electrolytic cell filled with a solution of ethanol, $NH_4NO_3$ and $NH_4OH$. Mercaptan concentration in the slip-stream was determined electrolytically by measuring the Ag ion generation rate required to maintain the cell at the millivolt level equivalent to a mercaptan titration end-point. As long as the catalyst remained active, the mercaptan content of the hydrocarbon slip-stream was less than 0.5 p.p.m. When the analyzer was not available, selected product cuts were taken for analysis to determine the mercaptan breakthrough curve.

EXAMPLE III

Under conditions identical to those of Example II above, except that the bed temperature was raised to 125° F. and the LWHSV was reduced to 5.1, a throughput of 94.3 wt./wt. was achieved at the point of 25 p.p.m., ethyl mercaptan breakthrough.

EXAMPLE IV

The reactor and catalyst bed were prepared and activated as in Example II above. The temperature of the catalyst bed was maintained at 125° F., the feed was pentane containing 0.2 percent ethyl mercaptan (1000 p.p.m. sulfur). At an air feed of 0.2 s.c.f/hour, a pressure of 80 p.s.i.g. and an LWHSV of 9.4, a throughput of 37 weight was achieved at a 10 p.p.m. of ethyl mercaptan breakthrough. The throughput to 25 p.p.m. ethyl mercaptan breakthrough was 41. This catalyst was regenerated at 700° F. with air at atmospheric pressure for 40 minutes and, under the same conditions as above, the throughput weight to 10 p.p.m. breakthrough was 39 and the throughput to 25 p.p.m. was 42.

EXAMPLE V

The catalyst described in Example I above was employed as an adsorbent for the removal of impurities from a secondary diesel reference fuel containing one percent each of thiophene, indole and benzaldehyde. The reactor and catalyst were prepared as in Example II above, but prior to going onstream, the bed was activated with nitrogen for four hours at 800° F. and cooled to 80° F. After this pretreatment, the adsorbent bed was placed onstream, the described reference fuel being passed over the adsorbent, the liquid weight hourly space velocity being 1.18. The breakthrough concentrations were set at 0.1 percent sulfur, 0.05 percent nitrogen, and 0.1 percent aldehyde. The throughput to breakthrough, weight of liquid/weight of catalyst, was 2.0 for sulfur, more than 9 for nitrogen and more than 9 for aldehyde. In another run under conditions similar to those described above except that the LWHSV was higher, the throughput for sulfur dropped somewhat but the throughput for nitrogen and aldehyde rose significantly. These data as well as a comparison of other adsorbents are summarized in Table I below.

TABLE I.—COMPARISON OF ADSORBENTS FOR IMPURITY REMOVAL FROM A DIESEL FUEL

Charge: T-15 secondary diesel reference fuel containing 1% thoiphene, indole, and benzaldehyde each by wt.
Conditions: room temparature adsorption.
[Bed activated at 800° F.]

| Adsorbent | Volume, ml. | LWHSV | Throughput to breakthrough, wt./wt. | | |
|---|---|---|---|---|---|
| | | | Sulfur | Nitrogen | Aldehyde |
| | | | [1] 0.1 | [1] 0.05 | [1] 0.1 |
| 13X molecular sieves | 400 | 1.16 | 0.3 | 0.9 | 1.8 |
| Catalyst of Example I | 300 | 1.18 | 2.0 | >9 | >9 |
| Catalyst of Example I | 320 | 1.42 | 1.1 | >12.1 | ~12.3 |
| 5% K on Pesudoboehmite II | 350 | 0.84 | 0.3 | >5.4 | >5.4 |
| 5% Cu on SiO-MgO | 400 | 0.92 | 0.8 | 4 | ~2.5 |
| Activated carbon | 400 | 1.27 | 0.9 | 3.5 | 2.7 |
| 5% Ti on silica-alumina | 400 | 0.92 | 0.1 | 1.1 | 0.9 |
| 5% As on Pseudoboehmite I | 400 | 1.22 | 0.7 | 3.4 | 3.5 |
| 5% Cr on activated carbon | 400 | 1.78 | 0.1 | 1.7 | 4.4 |
| 5% Ni on 13X molecular sieves [2] | 400 | 0.50 | 0.14 | 0.61 | 1.3 |

[1] Breakthrough Concentration, percent.
[2] Contaminants 2% by wt. in charge.

EXAMPLE VI

A cogelled precipitate was prepared and dried as in Example I above. 210.3 grams (350 cc.) of this dried gel were calcined by heating in air to 1000° F. in six hours and holding at 1000° F. for ten hours.

A selenic acid solution having a specific gravity of 1.04 and 10.4 percent equivalent of $SeO_3$ was prepared by dissolving 20.9 grams of $H_2SeO_4$ in water and diluting it to 170 ml. (176.3 grams). The 210.3 grams of calcined catalytic composite were broken up and impregnated with the selenic acid solution to incipient wetness. This impregnated material was oven dried for 24 hours at 250° F. and calcined in air in an electric muffle furnace brought to 700° F. in four hours and maintained at this temperature for 12 hours. The incipient wetness adsorptivity is 0.81 ml. of solution per gram of calcined composite. The calculated deposit is 5.0 percent Se or 8.02 percent $SeO_3$. The selenium is present on the calcined catalyst as $SeO_3$.

The catalyst described above was employed in a process for the low temperature selective oxidation of mercaptan sulfur to disulfide sulfur. A fixed-bed reactor was charged and activated as in Example II above. When the reactor had cooled to 80° F. the feed, normal pentane containing 0.2 percent of ethyl mercaptan (1000 p.p.m. sulfur) was charged upflow under atmospheric pressure, the LWHSV being 9.4. Air was added to the feed stream so as to yield 7 mols of oxygen per mol of ethyl mercaptan. The throughout to 25 p.p.m. breakthrough was 175.

EXAMPLE VII

A run was made under the identical conditions as described in Example VI except that no air or oxygen was added to the feed stream. The throughout weight to 25 p.p.m. breakthrough was 85.

EXAMPLE VIII

A fixed-bed reactor was charged with 50 grams of the selenium-promoted catalyst described in Example VI above and activated with air at 800° F. for five hours. When the temperature of the catalyst bed had dropped to 120° F., the feed, heptane containing 0.1 percent of butyl mercaptan, was charged upflow under atmospheric pressure into the reactor, the LWHSV being 10.1 air was added to the feed stream so as to yield 9.8 mols of oxygen per mol of butyl mercaptan. The throughput weight to 25 p.p.m. of butyl mercaptan breakthrough was 91.

EXAMPLE IX 169.5 grams (300 cc.) of cogelled precipitate prepared and dried as in Example I above were calcined in air by heating to 1000° F. in six hours and holding the temperature at 1000° F. for ten hours.

A potassium nitrite solution having a specific gravity of 1.02 and 1.84 percent equivalent of $K_2O$ was prepared by dissolving 3.74 grams of $KNO_2$ in water and diluting it to 111 ml. (112.6 grams).

The 169.5 grams of calcined composite were broken up and impregnated with the $KNO_2$ solution to incipient wetness. This wet material was oven dried for 24 hours at 250° F. and calcined in air in an electric muffle furnace by heating to 1000° F. for another ten hours. The incipient wetness adsorptivity is 0.65 ml. of solution per gram of composite. The calculated deposit is one percent potassium or 1.21 percent $K_2O$. Potassium is present on the calcined catalyst as $K_2O$.

The catalyst described above was employed in a process for sweetening a doctor sour hydrocarbon. A reactor was charged with 50 grams of potassium-promoted catalyst and activated in the manner described in Example II above. The feed, n-pentane containing 0.2 percent of ethyl mercaptan, was charged upflow into the reactor at atmospheric pressure, at an LWHSV of 9.4 when the catalyst bed had cooled to 80° F. Oxygen was added to the feed stream in the form of air at the rate of 0.2 s.c.f./hour. The throughput to 25 p.p.m. breakthrough was 72.

EXAMPLE X

The reactor was charged and activated as in Example IX above. When the catalyst bed had cooled to 125° F. the feed, pentane containing 0.2 percent of ethyl mercaptan was charged upflow into the reactor, the LWHSV being 3.75. Air was added to the feed stream at the rate of 0.2 s.c.f./hour under 80 p.s.i.g. pressure. The throughput to 25 p.p.m. mercaptan breakthrough was 30.9.

Obviously, many modifications and variations of the invention, as hereinabove set forth, can be made without departing from the spirit and scope thereof, and therefore only such limitations should be imposed as are indicated in the appended claims

We claim:

1. A catalyst composition consisting essentially of an iron group metal, silicon and oxygen chemically combined in an amorphous substantially sodium-free polymer in which the atomic ratio of iron group metal to silicon to oxygen is between about 1 to 2 to 5.5 and about 1 to 12 to 25.5, said iron group metal being present in said polymer as the group $$-\text{O}-\overset{\overset{\displaystyle\text{O}}{|}}{\underset{\underset{\displaystyle\text{O}}{|}}{\text{Fe}}}-\text{O}-$$

wherein Fe represents the iron group metal, said silicon being present in said polymer as the group $$-\text{O}-\overset{\overset{\displaystyle\text{O}}{|}}{\underset{\underset{\displaystyle\text{O}}{|}}{\text{Si}}}-\text{O}-$$

and said oxygen being present in said polymer as the group $\equiv\text{Si}-\text{O}-\text{Si}\equiv$, $\equiv\text{Si}-\text{O}-\text{Fe}\equiv$, or $$\equiv\text{Fe}-\text{O}-\text{Fe}\equiv$$

wherein Fe represents the iron group metal.

2. A catalyst composition in accordance with claim 1 promoted with an alkali metal or selenium.

3. A catalyst composition in accordance with claim 1 in which the iron group metal is iron.

4. A catalyst composition in accordance with claim 3 in which the atomic ratio of iron to silicon to oxygen is about 1 to 4 to 9.5.

5. A catalyst composition in accordance with claim 3 containing selenium as a promoter.

6. The method of making the catalyst composition according to claim 1 comprising the steps of mixing a water, ethyl alcohol or dioxane solution of an iron group metal salt with a silica sol, cogelling the mixture produced by said mixing, and calcining, the resulting cogelled material.

7. A process in accordance with claim 6 in which the iron group metal salt is an iron salt.

8. A process in accordance with claim 6 in which the proportion of iron group metal salt to silica sol is selected to result in a calcined cogelled product having an iron group metal to silicon to oxygen atomic ratio of between about 1 to 2 to 5.5 and about 1 to 12 to 25.5.

9. A process in accordance with claim 7 in which the proportion of iron salt to silica sol is selected to result in a calcined cogelled product having an iron to silicon to oxygen atomic ratio of about 1 to 4 to 9.5.

10. A process in accordance with claim 8 in which the calcined cogelled material is impregnated with an aqueous solution of an alkali metal nitrite or selenic acid and the impregnated material is calcined.

11. A process in accordance with claim 9 in which the calcined cogelled material is impregnated with an aqueous solution of selenic acid and the impregnated material is calcined.

References Cited

UNITED STATES PATENTS

| | | | |
|---|---|---|---|
| 1,577,190 | 3/1926 | Patrick | 252—452 |
| 1,696,645 | 12/1928 | Patrick | 252—452 |
| 1,721,523 | 7/1929 | Midgley, Jr. | 252—439X |
| 1,991,096 | 2/1935 | Jackson | 252—439X |
| 2,265,388 | 12/1941 | Melaven et al. | 252—459X |
| 3,346,509 | 10/1967 | Stewart | 252—453 |

PATRICK P. GARVIN, Primary Examiner

C. F. DEES, Assistant Examiner

U.S. Cl. X.R.

252—452, 459